UNITED STATES PATENT OFFICE.

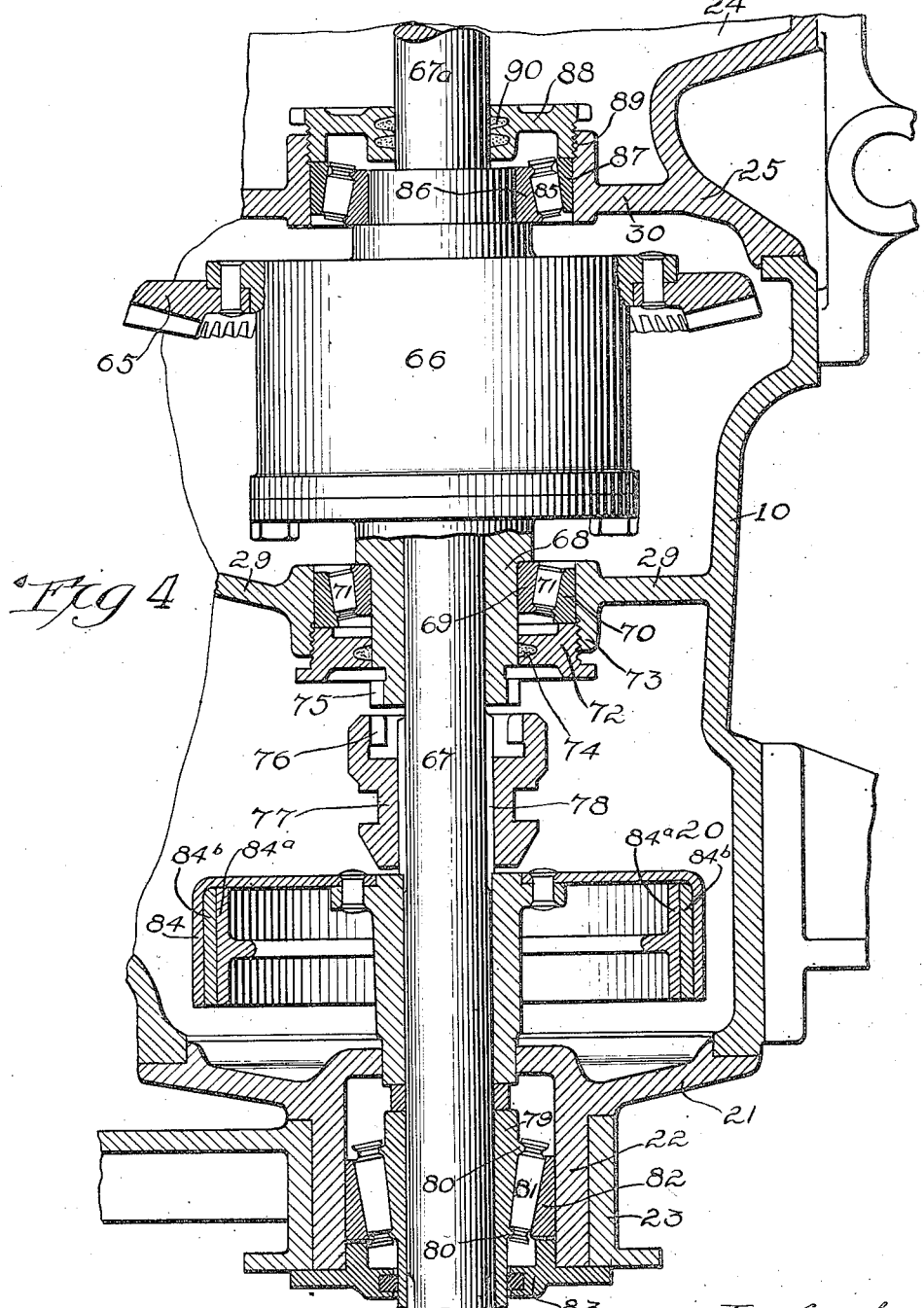

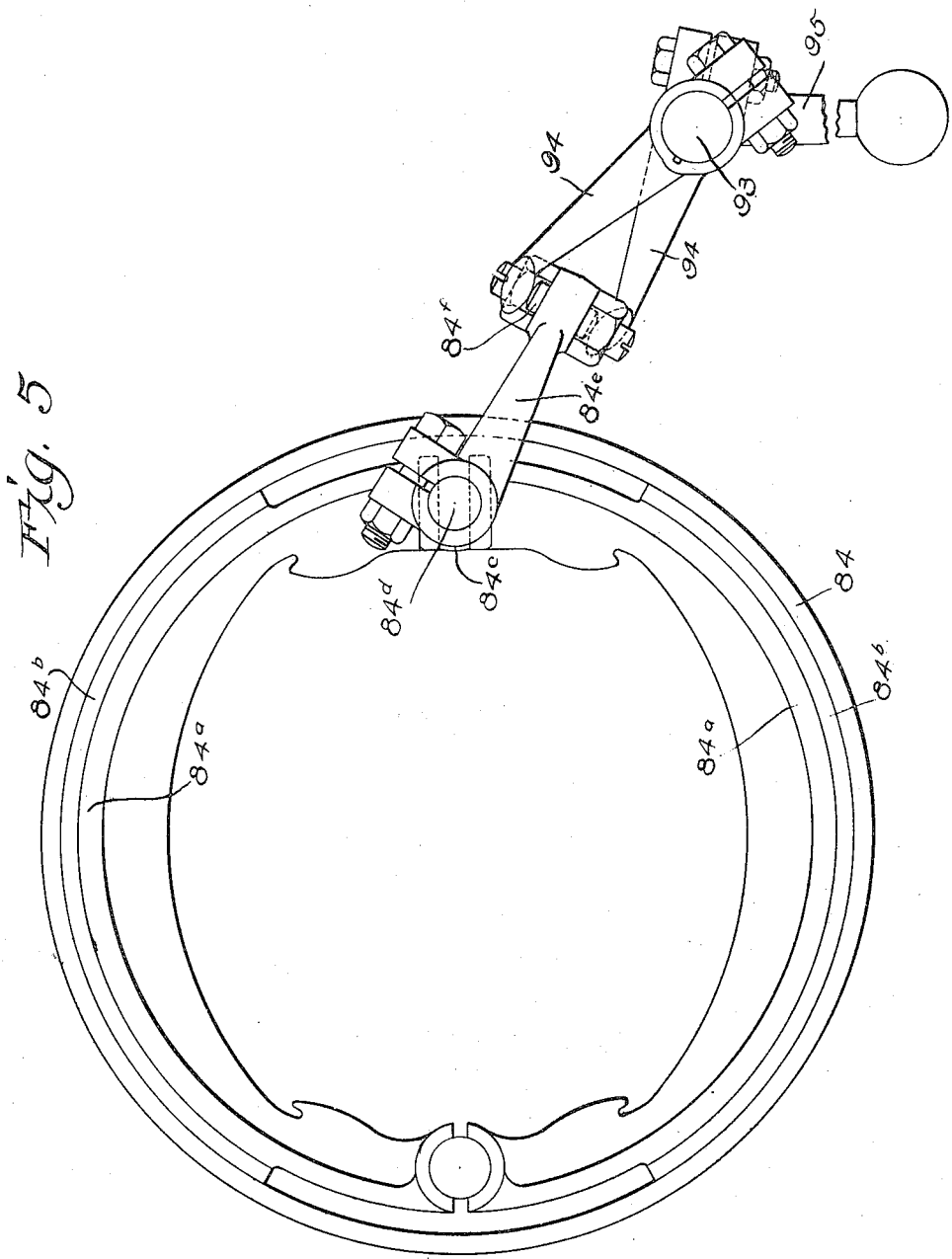

TRUMAN B. FUNK, OF MOLINE, ILLINOIS, ASSIGNOR TO MOLINE PLOW COMPANY, OF MOLINE, ILLINOIS, A CORPORATION OF ILLINOIS.

TRANSMISSION MECHANISM FOR TRACTORS.

1,320,541.        Specification of Letters Patent.        Patented Nov. 4, 1919.

Application filed September 22, 1917. Serial No. 192,714.

*To all whom it may concern:*

Be it known that I, TRUMAN B. FUNK, a citizen of the United States, residing at Moline, in the county of Rock Island and State of Illinois, have invented certain new and useful Improvements in Transmission Mechanism for Tractors, of which the following is a specification.

The tractor which is designed to embody the transmission mechanism of the present invention is of the general type shown and described in my co-pending application, Serial No. 173,016, filed June 5, 1917, being a tractor of the unstable type employing two driving ground wheels and relying for its rear support upon the trailing implement or device with which the tractor unit is associated. One of the peculiar characteristics of the tractor for which the present transmission mechanism is primarily designed is that the engine and associated connections are positioned to one side of the longitudinal center of the tractor in order to afford an unobstructed view ahead to the driver when the tractor is used for cultivating purposes.

The transmission of the present invention is designed to conform to this peculiarity in the engine arrangement, and is also designed to afford an extremely compact arrangement of the driving and transmission elements which are so mounted and disposed as to facilitate the assembling or disassembling of the transmission element and also with due regard to the desirability of fitting the engine as a unit to the transmission. The invention relates not only to the transmission elements themselves but to the frame or housing in its relation to the transmission elements which it incloses. The frame or housing is so designed as to not only afford suitable supports for the bearings which carry the rotating transmission elements, but also to afford the necessary elements of strength and rigidity required in a framework for the tractor as a whole. It will thus be understood that the transmission elements presently to be described are located and correlated in such a manner as to conform to the structural requirements of the tractor frame, and that one feature of the invention relates to this relationing of the transmission elements to the tractor as a whole.

This invention also relates to the features comprising the differential lock which is employed to afford a direct and positive transmission of power to the driving shaft independently of the differential where the ground conditions under the respective ground wheels are different, and where the slipping of one of the wheels might bring the tractor to a standstill as is sometimes the case when one of the wheels finds its footing in a furrow and the other wheel on hard ground.

The invention also relates to the differential brakes which are used in association with the differential mechanism to facilitate the steering of the tractor in soft ground where difficulty is often experienced in steering the tractor by the operation of the hand steering wheel. In these circumstances the respective brakes may be automatically adjusted to center the rotation on that one of the driving ground wheels which is required to describe the outside arc in making the turn.

In the drawings illustrating the invention—

Figs. 3 and 4 are companion complementary figures showing the bearings in section; and Fig. 5 is a detail of one of the differential brakes and the controlling mechanism therefor.

Figure 1:
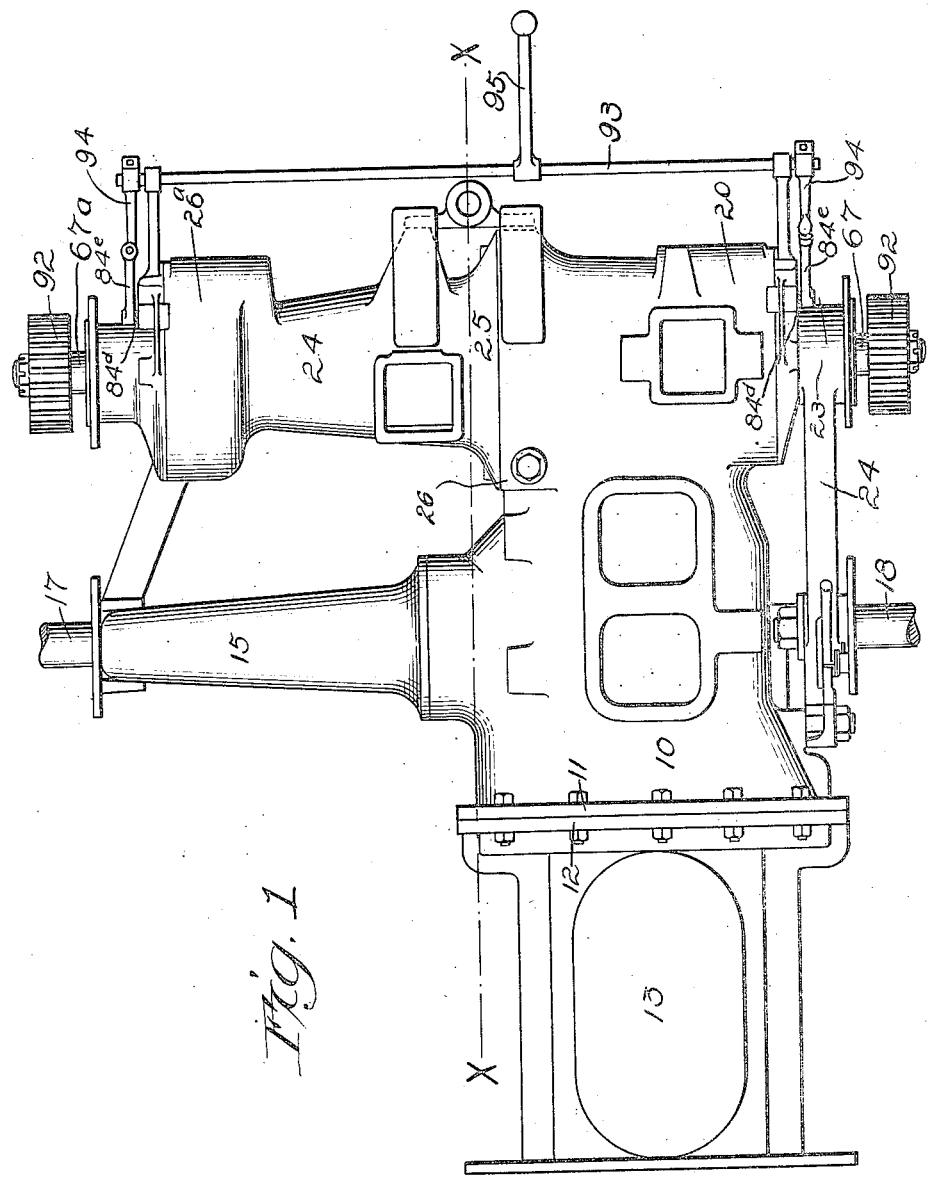
Figure 1 is a top or plan view of the tractor frame, engine, and associated parts, the longitudinal center of the tractor being indicated by the line $x$—$x$.
Figure 2:
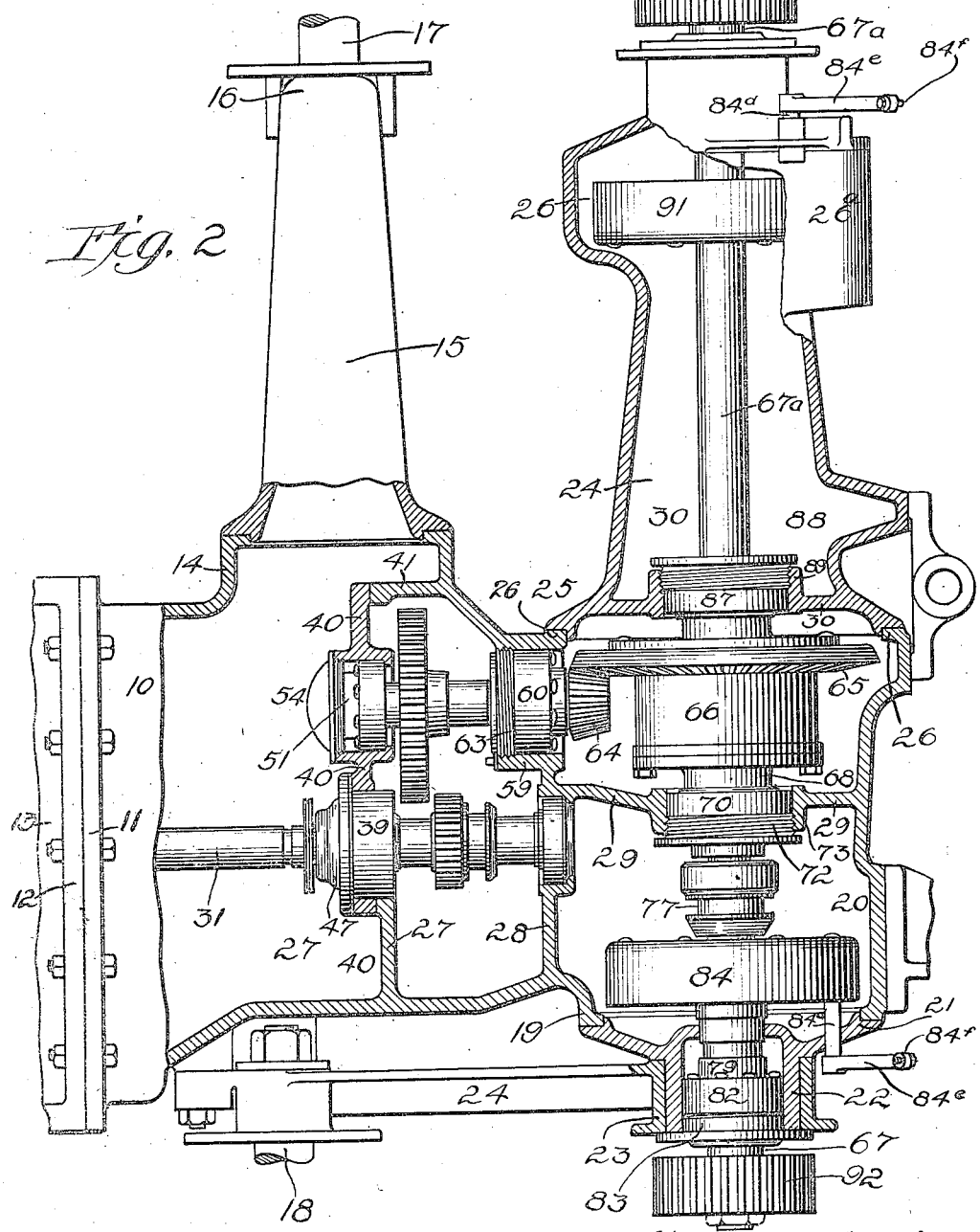
Fig. 2 is a plan view showing the housing sectioned to reveal the interior.

The tractor frame is in the form of a housing 10 which, as shown, is of generally tapering formation from front to rear. The open front end of the housing is provided with a flange 11 which coöperates with a similar flange 12 on the end of the engine casing in affording a means of connection for the engine 13 which is bodily secured as a unit to the front end of the housing from which it projects forwardly and by which it is suspended and supported. The housing near its forward end on the right-hand side looking forward is provided with a boss or protuberance 14 which serves as a point of connection for a laterally projecting wheel arm 15 which is down-turned at its outer end 16 and carries a stub shaft 17 upon which is journaled the right-hand ground wheel, not shown, which shaft 17 coöperates with a similar shaft 18 which carries the left-hand ground wheel.

The housing, at its rear end on the left-hand side, is provided with a boss 19 which furnishes a substantially cylindrical brake chamber 20, which latter is closed by means of a cap 21 carrying a cylindrical boss 22, upon which is journaled the head 23 of an adjustable arm 24.

The shaft 18 is carried by the adjustable arm, so that the ground wheel mounted upon the shaft 18 can be vertically adjusted for plowing, and whereby the vertical relationship of the ground wheels may be regulated so that the furrow wheel will contact the ground at a lower level than the land wheel.

On the opposite side of the casing is mounted a laterally projecting tubular arm 24 which is flared at its inner end 25 to make connection with the rim 26 of the housing, and the tubular arm 25 is bulged or enlarged near its outer end to afford a right-hand brake chamber 26ª which corresponds in general arrangement and location with the left-hand brake chamber 20. The interior of the housing is divided by a front cross partition wall 27 and a rear cross partition wall 28, which latter, on its rear side merges into a longitudinal rear partition 29.

The partition wall 29 coöperates with a cross wall 30 formed across the inner end of the lateral tubular arm 24, which arrangement serves to roughly divide the interior of the housing into a forward, an intermediate, and a pair of rear chambers for the reception of working elements to be presently described. The partition walls, furthermore, furnish the points of support for the bearings which mount the moving elements.

Figure 3:
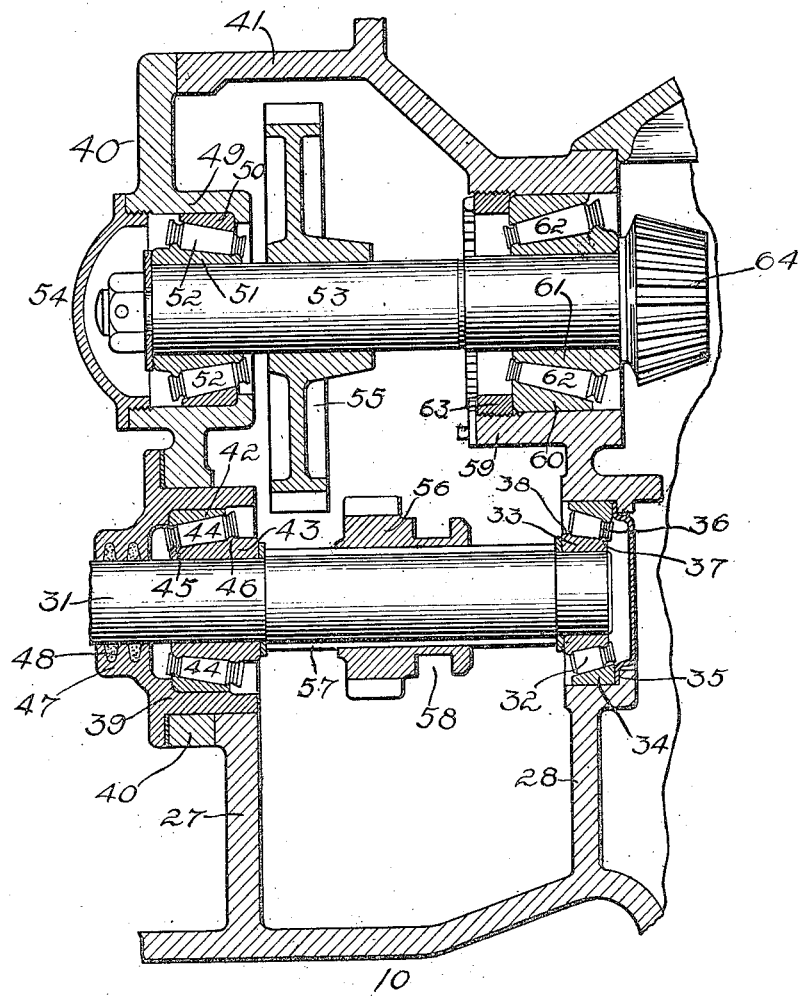

The engine drives an engine shaft 31 which is detailed in Fig. 3. The rear end of the shaft is journaled and supported by tapered roller bearings 32 which are set in oblique relation to the shaft and lie between a tapered collar 33 on the shaft and a beveled bearing ring 34 which is socketed within a recess 35 in the cross wall 28. Each of the roller bearings is provided with a groove 36 near its inner or reduced end, and the collar 33 is provided with inner and outer flanges 37 and 38 which engage the groove of the roller and its outer end respectively, so that accidental displacement is impossible. The shaft 31, at the point where it passes through the forward cross wall 27, is mounted in a journal bearing comprising a cylindrical cap 39 which is entered through a cross plate 40 which completes the closure partially afforded by the wall 27, and extends across the interior of the housing, and its outer edge bears upon the rim of a wall section 41, which arrangement provides a completely inclosed intermediate chamber.

The cap 39 sockets a beveled bearing ring 42 which coöperates with a beveled collar 43 to furnish a tapering runway for the reception of a plurality of tapered rollers 44 grooved at each end to receive annular flanges 45 and 46 formed on the periphery of the collar 43, the general arrangement being similar to the roller bearing elements first described. The cap 39 is provided with a neck 47 which receives a packing 48, the arrangement being one which permits the intermediate chamber to be utilized as an oil chamber without permitting the escape of the oil.

The plate 40 is formed to provide a bushing 49 which sockets a beveled ring 50 coöperating with a flanged collar 51 and tapered grooved rollers 52, which bearing elements serve to afford a mounting for a stub transmission shaft 53 which lies alongside of and in parallelism with the engine shaft. The bushing 49 is closed by a screw-cap 54 and power is transmitted from the engine shaft to the stub shaft through the medium of spur gears 55 and 56, the latter being slidable upon the spline 57 and provided with a grooved hub 58 for permitting longitudinal adjustment to throw the engine shaft into and out of train with the transmission stub shaft, as occasion may require.

The cross wall 28 is likewise provided with a bushing 59 which carries a beveled bearing ring 60 coöperating with a beveled flanged collar 61 and interposed tapered grooved rollers 62, which rollers are reversely tapered with respect to the taper of the rollers 52. The bearing ring 60 can be adjusted fore and aft within the bushing by means of an adjustable collar 63 which is threaded into the mouth of the bushing 59, the arrangement of the parts being such that by screwing in the ring 63, the rollers in the front and rear bearings for the shaft 53 will be held against longitudinal displacement without the necessity for affording additional means of support. The shaft 53, at its inner end, carries a beveled pinion 64 which meshes with a beveled gear ring 65 bolted or otherwise secured to the casing of a differential transmission 66 mounted upon a divided cross driving shaft 67—67ª extending transversely through the two rear chambers of the housing and through the lateral tubular arm 24. The shaft section 67, at its inner end, carries the hub 68 of the differential transmission, which hub has mounted thereon a beveled collar 69 coöperating with a beveled ring 70 and interposed tapered grooved rollers 71 to afford a roller mounting for the shaft section.

The ring 70 can be tightened and adjusted by means of an adjustable cap 72 which is threaded into a boss 73 on the cross wall 29, and carries a packing 74 in contact with the hub 68. The hub 68 is provided, at its outer end, with clutch lugs or teeth 75 which coöperate with the companion lugs or teeth 76 on a slidable locking collar 77 carried by a spline 78 on the shaft 67, so that by adjusting the locking collar, the shaft can be thrown into direct connection with the hub of the differential transmission and the power taken directly rather than through the medium of the differential elements, for the purpose of insuring uniformity of rotation where inequality in footing is afforded the respective ground wheels, as is the case where one of the wheels is traveling in a furrow.

The outer end of the shaft section 67 carries a tapered collar 79 provided with flanges 80 which engage the grooves of a set of rollers 81 which lie within a beveled bearing ring 82 housed within the boss 22 of the cap-plate 21. A packed closing cap 83 affords a closure for the outer end of the boss and bearing elements contained therein. Inside of the cap 21 and within the brake chamber 20 is located a brake drum 84 which is mounted upon the shaft section 67, and incloses a pair of brake shoes 84$^a$ which carry friction linings 84$^b$ and are adapted to be spread by the turning of an interposed cam 84$^c$ carried by a stub shaft 84$^d$ suitably journaled through an adjacent portion of the casing and carrying a lever 84$^e$ through the head of which is threaded a contact pin 84$^f$.

The companion shaft section 67$^a$ is journaled by means of grooved tapered rollers 85 interposed between a beveled collar 86 and a beveled bearing ring 87 similar to those heretofore described. The bearing ring is held in place and adjusted by a cap 88 threaded into a bushing 89 formed in the cross wall 30 and provided with packing rings 90 bearing against the shaft section 67$^a$. Near the outer end of the shaft section 67$^a$ is located a brake drum 91 similar to the brake drum 84 and provided with similar operating elements, and the outer end of the shaft 67$^a$ is journaled in bearings which are the duplicate in form and arrangement of those which mount the outer end of the companion shaft section 67.

Each of the shaft sections at its outer end is provided with a driving spur pinion 92, which spur pinions mesh with gear teeth on the respective ground wheels not shown.

The two levers 84$^e$ are adapted to act in alternation to one another, so that as the shoes of one of the brakes are spread to set the brake the shoes of the other brake will remain open, and this result is accomplished in the device as shown by the use of a cross brake shaft 93 which is suitably journaled in fixed relation to the brake cam levers, and is provided at each end with a brake operating finger 94 which is clamped or otherwise secured to the cross shaft. The fingers 94 are set in different angles on the cross shaft and bear in opposite directions against the respective contact pins, so that rotation of the cross shaft will cause only one of the fingers to impart an acting pressure to the associated cam lever, and will allow the other finger to recede from its point of contact, thereby setting the brake on that side of the tractor only which it is desired to retard. A reverse movement of the hand lever 95 which rotates the cross shaft will reverse the setting of the brakes.

The arrangement above described affords a highly convenient arrangement for use in connection with an engine located to one side of the longitudinal center of the tractor, and at the same time the construction is one which permits the engine with its shaft to be assembled and united to the transmission structure as a unit without difficulty and without in any way disturbing the remainder of the transmission elements. The provision of the stub shaft affords the necessary gear reduction and at the same time brings the longitudinal driving element into train with the transverse driving elements at a point quite near the center of the transverse line of shafting which is a desirable arrangement from every standpoint. The transverse shafting is arranged with due regard to the requirements of the framework for supporting purposes, and the transmission as a whole is arranged to occupy the interior of the frame housing without in any way impairing the strength or rigidity of the latter, and without subordinating its supporting functions to the requirements of the transmission features.

The use of the differential locking mechanism enables the ready employment of the tractor for plowing purposes in which it is required that the furrow ground wheel shall find its footing in soil which is comparatively loose and soft, and where slippage is liable to occur which would seriously retard, if not entirely prevent, the advance of the tractor with the differential in use. By providing the lock, the tendency of the furrow wheel to slip will be compensated and overcome by the grip of the ground wheel, since, with the lock in clutch, both wheels will be held in rigid connection with one another and be compelled to rotate in unison.

Furthermore, the use of the lock will overcome the occasional tendency of the tractor to turn in toward the furrow side of the field by reason of slippage of the furrow wheel, and will tend to hold the machine to its true line of advance without necessitating the constant use of the steering wheel to correct and overcome the veering tendency caused by such slippage. The use of the coördinately controlled brakes facilitates the steering of the machine operating in soft ground where it is sometimes quite difficult, if not impossible, to steer the machine by hand, in that the relative speeds of the two power driven ground wheels may be regulated and controlled, so that the machine will steer by its own power and relieve the operator of the necessity of manually steering the tractor and its associated trailing implement under such adverse conditions.

I claim:

1. In a tractor transmission mechanism, the combination of a casing, an engine secured to and supported by the casing, an engine shaft extending into and journaled within the casing, a longitudinal intermediate transmission shaft within the casing and in train with the engine shaft, a laterally extending arm secured to the casing on one side only thereof, and transverse transmission shafting extending through the casing and through the arm and in train with the longitudinal transmission shaft, substantially as described.

2. In a tractor transmission mechanism, the combination of a casing, an engine secured to the casing and forwardly extending therefrom and supported thereby, an engine shaft extending into and journaled within the casing, an intermediate stub transmission shaft adjacent to the engine shaft and in train therewith, an extension arm laterally extending from one side only of the casing, transverse shafting extending through the casing and through the laterally extending arm, and a differential on said shafting in train with the intermediate transmission shaft, substantially as described.

3. In a tractor transmission mechanism, the combination of a casing, an engine secured to the casing and forwardly extending therefrom and supported thereby, an engine shaft extending into and journaled within the casing, an intermediate stub transmission shaft adjacent to the engine shaft and in train therewith, an extension arm laterally extending from one side of the casing, transverse shafting extending through the casing and through the laterally extending arm, a differential on said shafting in train with the intermediate transmission shaft, and brake drums on the transverse shafting and located within the casing and the extension arm respectively, substantially as described.

4. In a tractor transmission mechanism, the combination of a casing constituting the main frame of the tractor and provided with front and rear transverse cross walls and a rear longitudinal cross wall dividing the casing into a front, an intermediate, and two rear chambers, an engine secured to and supported by the casing, an extension arm laterally extending from and connected to one side only of the casing and provided with a cross wall in spaced relation to the longitudinal rear cross wall of the casing, an engine shaft extending from the engine into the casing and journaled within the front and rear transverse cross walls, an intermediate longitudinally extending shaft within the casing and journaled within the front and rear cross walls and in train with the engine shaft, and transverse shafting extending through the casing and through the laterally extending arm and journaled within the rear longitudinal cross wall and the cross wall in the arm and in train with the intermediate longitudinal shaft, substantially as described.

5. In a tractor transmission mechanism, the combination of a casing constituting the main frame of the tractor and provided with front and rear transverse cross walls and a rear longitudinal cross wall dividing the casing into a front, an intermediate, and two rear chambers, an engine secured to and supported by the casing, an extension arm laterally extending from and connected to one side only of the casing and provided with a cross wall in spaced relation to the longitudinal rear cross wall of the casing, an engine shaft extending from the engine into the casing and journaled within the front and rear transverse cross walls, an intermediate longitudinally extending shaft within the casing and journaled within the front and rear cross walls and in train with the engine shaft, and transverse shafting extending through the casing and through the laterally extending arm and journaled within the rear longitudinal cross wall and the cross wall in the arm, and a differential on the transverse shafting in train with the intermediate longitudinal shaft, substantially as described.

6. In a tractor transmission mechanism, the combination of a casing constituting the main frame of the tractor and provided with front and rear transverse cross walls and a rear longitudinal cross wall dividing the casing into a front, an intermediate, and two rear chambers, an engine secured to and supported by the casing, an extension arm laterally extending from and connected to one side of the casing and provided with a cross wall in spaced relation to the longitudinal rear cross wall of the casing, an engine shaft extending from the engine into the casing and journaled within the front and rear transverse cross walls, as intermediate longitudinally extending shaft within the casing and journaled within the front and rear cross walls, gear elements affording a driving connection between said intermediate shaft and the engine shaft, and transverse shafting extending through the casing and through the laterally extending arm and journaled within the rear longitudinal cross wall and the cross wall in the arm, a differential on the transverse shafting in train with the intermediate longitudinal shaft, and brake drums on the transverse shafting and located within the casing and within the laterally extending arm respectively, substantially as described.

TRUMAN B. FUNK.